United States Patent Office 2,824,014
Patented Feb. 18, 1958

2,824,014

PRESERVATION OF FRUIT JUICES

George Sperti, Cincinnati, Ohio, assignor to The Institutum Divi Thomae Foundation, Cincinnati, Ohio, a corporation of Ohio No Drawing. Application January 19, 1954
Serial No. 405,049

9 Claims. (Cl. 99—218)

This invention relates to an improved process whereby fruit juices can be preserved in fresh condition, without concentration, freezing, or adulteration, for substantial periods long enough to provide for commercially practicable distribution thereof to the ultimate consumer. This application is a continuation-in-part of my prior application Serial No. 337,681, filed February 18, 1953, now abandoned.

Many fruit juices deteriorate very rapidly once they have been extracted from the fruit. Although the mechanism responsible for all of the observed changes cannot be described exactly, it is generally accepted that undesirable oxidative and enzymic reactions take place and that contamination of the juice with various microorganisms may also contribute to such deterioration. Oxidation, for example, undoubtedly plays a large part in the deterioration of flavor that takes place very rapidly upon exposure of a freshly extracted juice to the atmosphere. The enzyme systems existing in many juices are not completely understood, but it appears that such oxidative changes are accelerated by enzymic activity. Furthermore enzymes such as the pectinesterase of citrus juices are responsible to varying degrees for other deleterious changes such as digestion of the pulp and solid matter, with resultant changes in flavor and settling and clarification of the juice, loss of vitamin C potency, acid fermentation, and the like. On the other hand, the growth of microorganisms such as yeasts, molds and bacteria must be controlled so as not to become excessive before the juice can be distributed and consumed. For commercial purposes, a keeping time of several weeks is necessary.

It is known, of course, that fruit juices can be pasteurized and their enzymes inactivated by heat and this method has been practiced to some extent in canning orange and other juices. As a rule fruit juice flavors are very heat-labile, however, and the heat-treated juices acquire a "cooked" taste quite different from that of freshly extracted juice. In any event the rather highly volatile flavor constituents are volatilized and lost to a large extent.

In order to avoid such deleterious effects of heating, it has been proposed to irradiate fruit juices with ultraviolet light to inactivate the enzymes and to destroy bacteria, yeasts, and molds. But although the full ultraviolet spectra of available sources of ultraviolet radiation contain only small fractions of the total energy consumed by such sources, still a relatively large proportion of this ultraviolet energy is emitted at relatively short wave lengths (below about 2650 A.) at which oxidative and other changes are caused to take place in the juice with resultant development of off-flavors which make the product unacceptable. Thus M. A. Joslyn and G. L. Marsh concluded that because of the formation of off odors and off flavors, the promiscuous irradiation of fruit juices with ultraviolet light was to be discouraged (The Fruit Products Journal and American Vinegar Industry, October 1944).

By making use of various known ways of filtering out all or substantially all wave lengths below about 2650 A., it is possible to avoid such off-flavors and still accomplish a certain degree of preservation since wave lengths below about 2900 A. are destructive to enzymes, bacteria and other microorganisms. But the amount of energy emitted in the active and relatively narrow range of 2900–2650 A. is a very small fraction of the total energy of the source of irradiation. Furthermore, as a general rule ultraviolet radiation produces only surface effects, being incapable of penetrating below the surface of the juice to any substantial depth. Even at the surface, moreover, microorganisms and enzymes may be shielded by any solid matter such as pulp that may be present in the juice. For all of these reasons it has been necessary for effective preservation by such filtered radiation to irradiate the juice in very thin films, of the nature of those picked up and carried by a revolving drum (say 0.01″), and to prolong the irradiation until all or nearly all portions of the juice have been so exposed. For example, Rentschler et al. U. S. Patent No. 2,482,507 describes the sterilization of liquids by recirculating the liquid in the form of thin films of the order of 0.04 mm. thickness while exposed to ultraviolet radiation largely concentrated at about 2537 A. U. and of low intensity. Under these conditions irradiation periods of eight hours or more were required to effect sterilization.

Thus although the efficacy of such procedures with regard to the keeping qualities of fruit juices can be demonstrated in the laboratory, where small batches of juice can be irradiated for long periods, they are not practicable for commercial operations. Moreover, the nutritional value of fruit juices is dependent mainly on their vitamin content and it is known that some vitamins, especially vitamin C, are subject to oxidative deterioration that is accelerated by both visible and ultraviolet light and may be decomposed by ultraviolet radiation even under anaerobic conditions. In irradiation procedures such as those described above, the vitamin content of the juice is being continually exposed to a combination of these adverse factors at the surface of the juice over long periods of time, and even though such prolonged irradiation may not cause serious flavor changes, it is calculated to destroy rather than to preserve the vitamin potency of the juice.

The present invention resides in a process of controlled irradiation of fruit juices with ultraviolet light to produce a degree of pasteurization and enzyme inactivation sufficient, when coupled with storage under inert gas and ordinary refrigeration, to preserve the juice in its fresh state for periods of the order of three or four weeks. Under the conditions of this process, moreover, the juice can be irradiated in a continuously flowing stream of commercially practicable volume. Thus the invention makes possible the commercial processing and distribution of fresh juice from the growing locality to the ultimate consumer at remote points. Within time limits of this order, no appreciable deterioration takes place in taste or flavor; also the freshly irradiated juice has substantially the same vitamin content as the freshly extracted juice before irradiation, and although there may be a gradual slow drop in vitamin level during storage, it remains very high throughout periods of the length mentioned.

The treatment of the juice in the quantities required in commercial practice necessitates the irradiation of a continuous stream with rather rapid flow. Such a stream can of course be spread out in a layer for irradiation, but it is impracticable to maintain a continuous flowing film of the thinness considered necessary for effective treatment under ordinary conditions of irradiation. In order to process large volumes, such films must flow rapidly with the consequence that the time of exposure of the juice is very short unless the irradiation zone and equipment are unduly large and extended. The result of all of the foregoing factors has been that ultraviolet irradiation has never proved practical heretofore as a means of preserving orange juice.

It has now been found that surprising results can be obtained with a very short period of exposure of the juice to the ultraviolet radiation, provided that suitably filtered radiation of high intensity is employed. The combination of filtering and short exposure makes it possible to irradiate the juice without the development of the "cooked" taste or other off flavor so often encountered in prior processes as illustrated by the Joslyn and Marsh article cited above. On the other hand, an outstanding result of such short-term high-intensity irradiation appears to be the killing of bacteria not merely on the surface of the juice but throughout a layer of the order of 0.5 cm. thick. This effect was demonstrated by way of example in the following experiments:

Nutrient broth was inoculated with a culture of *Sarcina lutea*, agitated, and incubated for 15 hours at 37.5° C. After further agitation, 0.5 ml. of the culture was added to 9 ml. of water, mixed and allowed to stand for 60 minutes. After agitation, 2 ml. of the aqueous culture was added to a Petri dish (two dishes were used for each period of exposure) and thoroughly mixed with 12 ml. of nutrient agar and allowed to harden. This gave a distribution of bacteria throughout the medium which had an average thickness of 0.43 cm. The plates were then exposed at a distance of 6 inches to the ultraviolet lamps hereinafter described for various periods of time. The plates were then closed and incubated at 37.5° C. They were examined after 28 hours and after 48 hours.

After 28 hours, in the plates irradiated for 1 second, growth was reduced to about one-half of that in the control; 3 seconds' irradiation reduced the growth to one-fourth; and 5 seconds' irradiation resulted in no growth. After 48 hours' incubation, growth in the plates irradiated for 1 second was similar to the unirradiated control; 3 seconds' irradiation reduced the growth to one-fifth of the control; and 5 seconds irradiation resulted in no growth.

Growth was reduced not only on the surface but throughout the depth of the medium.

It has also been found that short-term high-intensity radiation of such a relatively thick flowing film (say 1/32 to 1/8 inch) very effectively inactivates enzymes such as pectinesterase throughout the body of the juice. In addition to improvement in keeping qualities by reducing oxidative tendencies, such enzyme destruction has other beneficial effects including for example the prevention of the usual fairly rapid separation of citrus juices into a layer of more or less solid matter and a clear supernatant.

Still further, the above mentioned desirable results are secured with no material decrease in the vitamin potency of the juice.

Thus it is possible, through the short-term high-intensity irradiation of a relatively thick, rapidly flowing film, to process fruit juices in commercially practicable quantities and to obtain fresh single strength juice that will keep under ordinary refrigeration for periods up to four weeks or more without material deterioration.

Various juices can be treated in the above manner, including particularly the juices of the citrus family such as orange, grapefruit, tangerine and tangelo, and others used for beverage purposes such as pineapple, papaya, and grape. For purposes of illustration, the treatment of orange juice has been described specifically hereinafter, but it will be understood that the conditions of operation set forth below are typical and that the procedure can be applied in substantially the same way to other juices such as those mentioned above.

A preferred embodiment of the invention comprises the combination of the following steps and conditions:

(1) The juice flows continuously through the irradiation zone in a layer which, although thin by ordinary standards, is nevertheless many times thicker than films of the kind mentioned in the Rentschler et al. patent as set forth above. Preferably this layer is between the approximate limits of 1/32" and 1/8" in thickness and preferably near the lower of these limits.

(2) A source of ultraviolet radiation is used which emits a relatively large amount of ultraviolet energy in the region below 2900 A., with the elimination by filtering or otherwise of substantially all radiation below about 2650 A.

(3) A rate of flow is maintained that is sufficient in relation to the length of the irradiation zone to provide an average time of exposure to ultraviolet radiation of at least 3–4 seconds. As the thickness of the juice layer increases, either the time of exposure or the intensity of the ultraviolet radiation or both should also be increased somewhat in order to obtain the same effect, but under practical condition a maximum of about 10–15 seconds is sufficient. Longer exposures are undesirable because they require larger equipment in order to avoid reduction of volume.

Within the limits stated above, it is possible to maintain continuous production under commercially practicable conditions as to size of equipment, consumption of energy, and volume of product, and to obtain preservative effects sufficient to provide the keeping qualities mentioned above without material deterioration of flavor.

Any suitable type of equipment can be employed in which the flowing stream of juice can be spread out in a layer of the desired thickness and exposed the desired length of time. The simplest form of equipment is probably a flat shallow pan or trough, the juice being distributed across one end by means of suitable spreading nozzles or other means, flowing across the surface as a thin sheet, and being collected at the other end. If desired, the surface of the juice can be protected against oxidation by a suitable inert atmosphere. Also the surface of the pan may be provided with ribs or other means to provide a mild degree of turbulence of the juice, but this is not necessary. Usually the volume of cool juice flowing over the pan is sufficient to absorb the heat of the light sources without undue increase in temperature, but if desired the pan may be cooled artificially and/or the heat emitted by the light sources may be dissipated by circulating air.

Any suitable type of filter can be employed to eliminate undesirable short wave radiation, various liquid solutions and transparent glasses having known transmission characteristics suitable for the present purpose. For example, relatively transparent bulbs of quartz or Vycor glass may be enclosed in Corex glass which does not transmit appreciably below 2800 A. The most convenient and widely used source of ultraviolet radiation is the mercury arc, although any other source can be used if desired. Preferably, however, the mercury arc should be of the high temperature-high pressure and voltage type in order to emit a greater proportion of energy in the useful region of 2900–2650 A. In fact, operation of this process has shown that filters may be omitted if the lamp operating pressure is high enough. Preferably also the lamps should be placed close to the flowing layer of juice, say 6", in order not to sacrifice intensity of radiation, but stronger sources can be employed at greater distances if desired.

By way of example, one installation which gave excellent results employed quartz mercury arcs enclosed in Corex envelopes. The arc tubes were 1" in diameter and 50" long, the arc length between the electrodes being 48¼". Each tube was operated by a transformer and reactor rated at 850 volts, open circuit, under the following conditions:

| | |
|---|---|
| Tube watts | 3000 |
| Operating amps | 6.7 |
| Starting amps | 9.2 |
| Arc volts | 525 |

There was practically no emission below 2800 A, and the total ultraviolet energy emitted between 2800 A. and the visible region (above 3800 A.) was less than two percent of the wattage of the lamp, but approximately one third of this emitted ultraviolet energy was concentrated in the region of 2800–3200 A.

These lamps were placed above and transverse to the direction of flow of a layer of orange juice about 1/32" thick, the lamps being located 6" above the surface of the juice parallel to each other and 30" apart. The width of the flowing layer or stream of juice was approxiately the same as the length of the tubes, i. e., 49½". Under these conditions an average exposure time of about 5 seconds was sufficient; this was attained by making the irradiation pan or trough 146" long and flowing the layer of juice over the pan at the rate of 650 gallons per hour. Four lamps were required to cover the area of the pan effectively.

After irradiation, the juice is filled directly into bottles, cartons or other containers, an inert gas such as nitrogen being bubbled through the containers during the filling process. It is not necessary to seal the containers; in fact, excellent results have been obtained with waxed cartons of a type used for selling milk. Under ordinary refrigeration (say 40° F.), juice so packed will keep without appreciable deterioration as much as 3 to 4 weeks until sold to the ultimate consumer and will be equal to freshly extracted juice in taste, flavor, and appearance. Of course, it is not essential to fill the irradiated juice directly into the consumer package. It can be stored and shipped in tank trucks or cars until time for ultimate distribution, provided adequate refrigerating and oxygen-excluding measures are taken.

Throughout such holding periods, no substantial digestion of the pulp or sedimentation takes place, whereas untreated juice kept under the same conditions rapidly clarifies. Thus it is evident that destruction or inactivation of enzymes has taken place to a substantial degree, and that under the conditions set forth above, the ultraviolet radiation has much more than a mere surface effect on the juice. Because of lack of established methods, this loss of enzymic activity cannot be measured directly except in the case of pectinesterase where the method of MacDonnell et al. is available (Archives of Biochemistry, vol. 6, No. 3, pp. 389–401). Using this method, two sets of determinations were made using different screen sizes to vary the amount of pulp in the juice. The results were as follows:

Percentage of pulp in juice:
  (a) With 0.060" screen—11%
  (b) With 0.033" screen—8%

| | Pectinesterase Units | Percent Loss of activity |
|---|---|---|
| (a) With 0.060" screen: | | |
| Raw Juice | 45.4 | |
| Irradiated Juice | 41.8 | 7.93 |
| (b) With 0.033" screen: | | |
| Raw Juice | 22.8 | |
| Irradiated Juice | 18.9 | 17.11 |

In another test made to demonstrate the inactivation of pectinesterase, a thin film of freshly extracted orange juice was irradiated in a thin film for 15 minutes, using a high pressure mercury arc lamp. This treatment was found to destroy 28% of the pectinesterase activity.

Also the fact that no difficulties are encountered throughout the aforementioned holding periods with development of yeasts, molds or bacteria or with fermentative or like effects shows that the irradiation of the juice has a pasteurizing effect substantially beyond what would be expected of a mere surface effect.

Another important property of the juice is its vitamin potency. In the case of vitamin C this can be measured directly by ascorbic acid determinations. Comparative determinations using fresh juice as a control indicate that vitamin C is not destroyed to any substantial degree during irradiation; furthermore, the irradiated juice retains the greater part of its vitamin potency throughout storage periods of the length mentioned above. For example, in one series of tests the untreated orange juice contained 31.31 mg./100 ml., and the same juice immediately after irradiation contained 31.12 mg. In storage tests, the vitamin C level in the freshly irradiated orange juice was 60 mg.; after one week, 57 mg.; after two weeks, 53 mg.; after three weeks, 48 mg.; and after four weeks, 35–40 mg.

It is evident, therefore, that the invention makes it commercially practicable to distribute fresh fruit juices to the ultimate consumer without heat treatment, concentration, or adulteration. The product may be sold through grocery stores or delivered from door to door in bottles or cartons and in the same manner that milk is handled. Also it is very well suited for use in coin-controlled vending machines, or in dispensing machines used behind drug store and restaurant counters or in hotel and restaurant kitchens, since large quantities of the juice can be held on draft for extended periods without deterioration.

It will be understood that the invention is not restricted to the details of the foregoing description or examples, and that reference should be had to the appended claims for a definition of its limits.

What is claimed is:

1. A process for the treatment of fruit juice which comprises continuously flowing freshly extracted juice in a layer 1/32" to 1/8" in thickness through an irradiation zone and subjecting the juice therein to ultraviolet radiation containing substantially no energy of wave lengths shorter than 2650 A., the rate of flow of the juice being correlated with the length of said zone to provide an average hold-up time of the juice in said zone of 3–15 seconds, and then storing the irradiated juice under refrigeration with exclusion of oxygen.

2. A process for the treatment of fruit juice which comprises continuously flowing freshly extracted juice in a layer 1/32" to 1/8" in thickness through an irradiation zone and subjecting the juice therein to ultraviolet radiation containing substantially no energy of wave lengths shorter than 2650 A., the rate of flow of the juice being correlated with the length of said zone to provide an average hold-up time of the juice in said zone of 3–15 seconds, and then storing the irradiated juice in a non-oxidizing atmosphere under refrigeration at a temperature of about 35–40° F.

3. A process for the treatment of fruit juice which comprises continuously flowing freshly extracted juice in a layer 1/32" to 1/8" in thickness through an irradiation zone and subjecting the juice therein to ultraviolet radiation containing substantially no energy of wave lengths shorter than 2650 A., the rate of flow of the juice being correlated with the length of said zone to provide an average hold-up time of the juice in said zone of 3–15 seconds, filling the juice into consumer packages while passing an inert gas therethrough to displace oxygen, and maintaining said packages under refrigeration at a temperature of about 35–40° F.

4. A process for the treatment of fruit juice which comprises continuously flowing freshly extracted juice through an irradiation zone in a layer 1/32" to 1/8" in thickness, regulating the rate of flow of the juice to provide an average juice hold-up time in said zone of 3–15 seconds, and exposing the juice in said zone to ultraviolet radiation containing substantially no energy of wave lengths shorter than 2650 A. and substantially corresponding in energy distribution and intensity to the radiation furnished by a 3000 watt quartz mercury arc located approximately 6″ from the surface of the juice layer and operated at a mercury pressure substantially above atmospheric pressure in an envelope of Corex glass, and then storing the irradiated juice under non-oxidizing conditions and at a temperature of about 35–40° F.

5. A process for the treatment of fruit juice which comprises continuously flowing freshly extracted juice through an irradiation zone in a layer 1/32″ to 1/8″ in thickness, regulating the rate of flow of the juice to provide an average juice hold-up time in said zone of 3–15 seconds, and exposing the juice in said zone to ultraviolet radiation containing substantially no energy of wave lengths shorter than 2650 A. and substantially corresponding in energy distribution and intensity to the radiation furnished by a 3000 watt quartz mercury arc located approximately 6″ from the surface of the juice layer and operated at a mercury pressure substantially above atmospheric pressure in an envelope of Corex glass, filling the irradiated juice into consumer packages while passing an inert gas therethrough to displace oxygen therefrom, and maintaining said containers at a temperature of about 35–40° F.

6. A process as defined in claim 5 in which said juice is a citrus juice.

7. A process as defined in claim 6 in which said juice is orange juice.

8. A process as defined in claim 6 in which said juice is grapefruit juice.

9. A process for treating fresh fruit juice to enhance its keeping qualities without heating, which comprises subjecting the juice to radiation from a source emitting relatively high intensity ultraviolet radiation above about 2650 A., the juice flowing through an irradiation zone in a relatively thin layer about 1/32″ to 1/8″ thick at a rate such that the exposure of the juice to irradiation is about 3–15 seconds, the ultraviolet energy emitted by said source below the visible region (below about 3800 A.) being substantially all above 2650 A., and then storing the irradiated juice under refrigeration and non-oxidizing conditions.

References Cited in the file of this patent
UNITED STATES PATENTS

| | | |
|---|---|---|
| 2,204,131 | Glunz | June 11, 1940 |
| 2,258,765 | James | Oct. 14, 1941 |
| 2,260,823 | Bettis | Oct. 28, 1941 |
| 2,421,382 | Levinson et al. | June 3, 1947 |
| 2,452,201 | Levinson et al. | Oct. 26, 1948 |
| 2,482,507 | Rentschler et al. | Sept. 20, 1949 |
| 2,670,439 | Darney | Feb. 23, 1954 |
| 2,674,697 | Nicholson | Apr. 6, 1954 |